Oct. 19, 1954  R. H. FORGY  2,691,930
ADJUSTABLE EARTHWORKING IMPLEMENT
Filed May 18, 1950  2 Sheets-Sheet 1
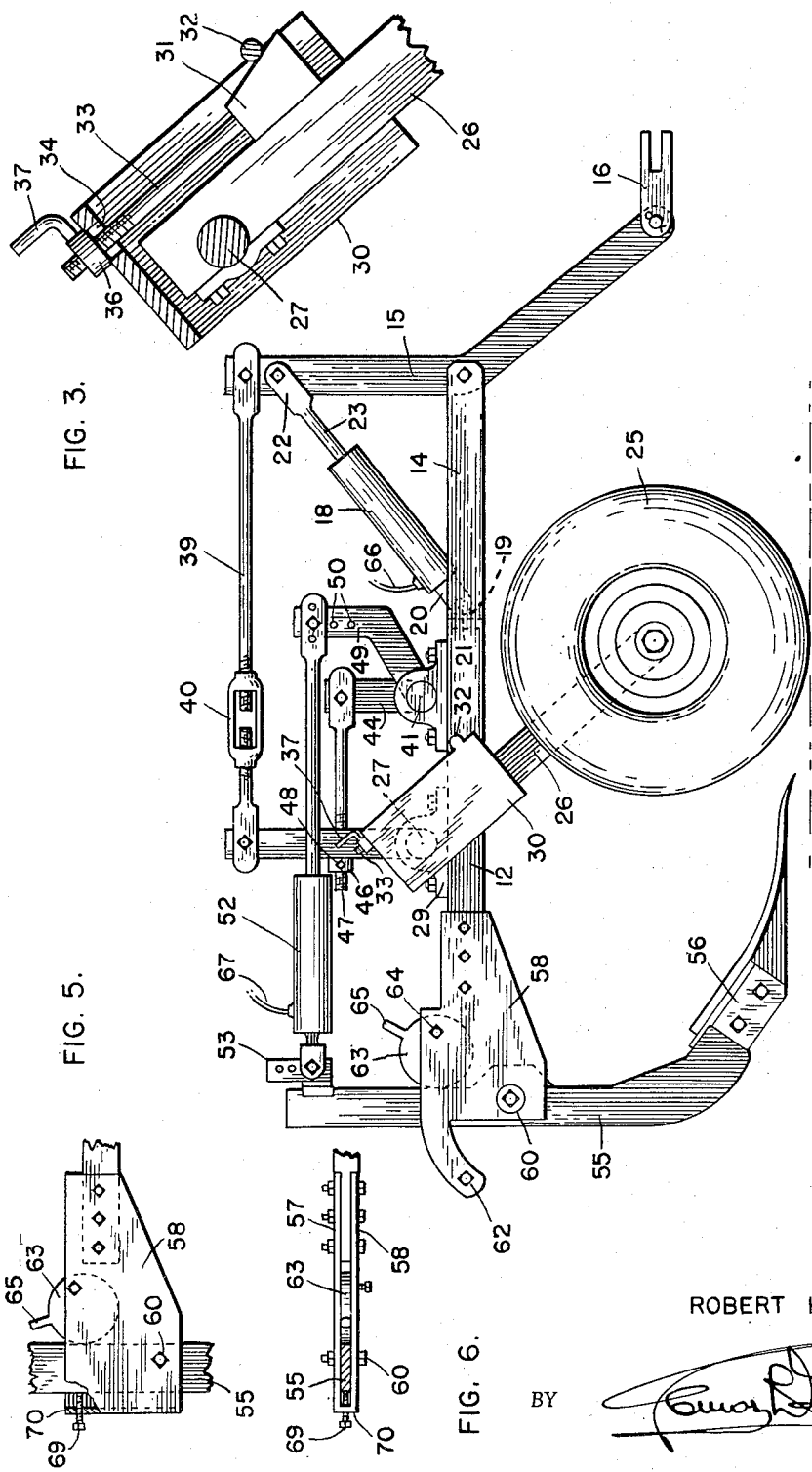
INVENTOR
ROBERT H. FORGY
BY 
ATTORNEY Oct. 19, 1954 R. H. FORGY 2,691,930
ADJUSTABLE EARTHWORKING IMPLEMENT
Filed May 18, 1950 2 Sheets-Sheet 2

INVENTOR
ROBERT H. FORGY
BY
ATTORNEY

Patented Oct. 19, 1954

2,691,930

UNITED STATES PATENT OFFICE 2,691,930

ADJUSTABLE EARTHWORKING IMPLEMENT

Robert H. Forgy, Centralia, Kans.

Application May 18, 1950, Serial No. 162,789

6 Claims. (Cl. 97—46.27)

This invention relates to agricultural implements and is more particularly concerned with earthworking implements.

One of the objects of this invention is the provision of an implement of the type mentioned which includes means for adjusting the angle of incidence of the earthworking tool and means for adjusting the depth of operation of the tool.

Another object is the provision of an implement of the type mentioned in which the adjustments referred to can be made while the implement is in operation.

A further object is the provision of such an implement supported on ground wheels in combination with a frame structure in which a plurality of adjustments are provided for raising and lowering the frame in relation to the ground wheels and for positioning the earthworking tool relative to the frame including tilting.

Still further objects and advantages of this invention will be apparent from the following description and the accompanying drawing forming together a full disclosure of the invention.

In the drawing:

Figure 1 is a side elevational view of an embodiment of the invention.

Figure 3 is a section along the line 3—3 of Figure 2;

Figure 5 is another fragmentary isometric view showing a further modification;

Figure 6 is a top plan view of the parts shown in Figure 5.

Figures 2, 4:
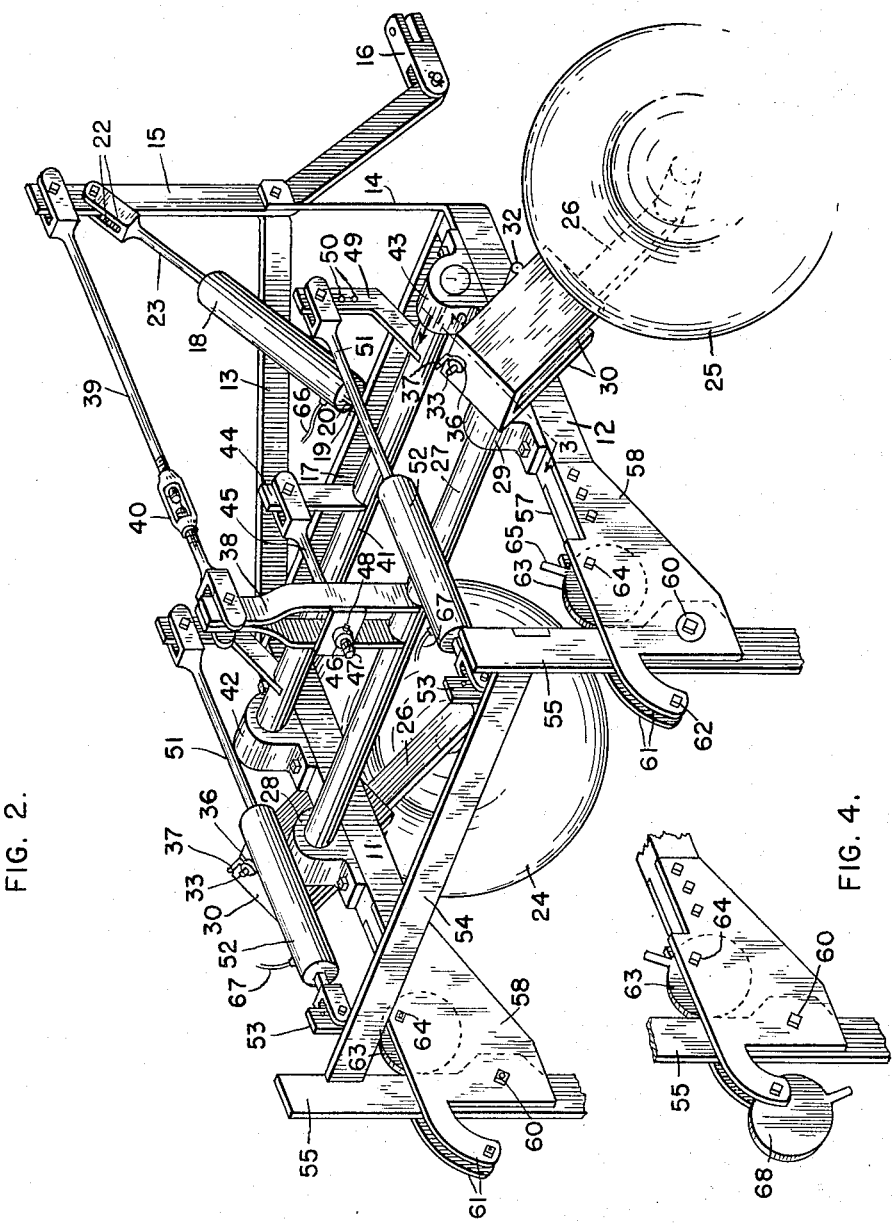
Figure 2 is an isometric view of the same embodiment.
Figure 4 is a fragmentary isometric view showing a modification of a portion of the embodiment.

Referring with more particularity to the drawing in which like numerals designate like parts, the embodiment illustrated comprises a suitable frame structure which includes a pair of horizontal side beams having rear portions or members 11 and 12 which are parallel to each other and front portions 13 and 14, respectively, converging forwardly to a point where they pivotally carry a vertical lever 15. The lower portion of the lever 15 may be bent forwardly, as shown, and its lower end attached to a draw bar or hitching link 16 for connecting the implement to a tractor or other propelling means.

A cross bar 17 is disposed between the forward ends of the parallel rear members 11 and 12 to add transverse rigidity to the structure and to act as an abutment for one end of a hydraulic cylinder or jack 18. The cross bar carries a pair of spaced lugs 19 between which a fin 20 at the end of the cylinder 18 is disposed and pin connected by means of a bolt 21 or other suitable means.

The outer end 22 of the piston rod 23 of the hydraulic cylinder is yoked and pivoted to the upper end of the vertical lever 15. By these means actuation of the cylinder piston effects a pivoting action of the lever 15.

The frame structure is supported on two ground wheels 24 and 25. Each wheel is carried at the lower end of an arm 26 the upper end of which is pivoted to the outer end of a cross axle or axle shaft 27. Said axle is rotatably carried in bearings 28 and 29 that are secured to the members 11 and 12, respectively.

A yoke member 30 straddles the upper end of each arm 26 and is secured for rotation with the axle 27. In normal position, the arm 26 is disposed downwardly toward the front of the implement so that the weight on the wheels tends to rotate them counter-clockwise relative to the frame. In order to hold the wheels in adjusted position relative to the frame, an adjusting wedge 31 is slidably disposed on the top side of the arm 26 within the yoke 30. The top side of said wedge is tapered upwardly as shown and engages an abutment bar 32 secured to the top side of the yoke. Accordingly, changing the position of the wedge on the arm 26 changes the distance between the arm 26 and the bar 32 and causes the said arm to pivotally move on the axle 27 relative to the yoke.

Any suitable means may be used for adjusting the position of the wedge, the means illustrated comprising a bolt 33, the inner end of which is secured to the wedge and its outer end passing through an aperture 34 in the top of the yoke. The outer end of the bolt carries threads which are engaged with a nut 36 lying against the top of the yoke. The nut may be provided with a crank arm 37 to facilitate turning it manually or otherwise.

A vertical yoke arm 38 is secured at its lower end to axle 27 by any suitable means such as welding. The upper end of said yoke arm is pivoted to one end of an adjustable link 39. The other end of said link is pivoted to the upper end of the vertical lever 15. The length of the link 39 is adjustable by means of a buckle joint 40.

A jack shaft 41 is rotatably mounted forward of and parallel to the axle 27 in bearings 42 and 43 on the members 11 and 12, respectively. A vertical arm 44 is fixed at its lower end to the shaft 41 and the upper end thereof is pivoted to one end of a drag link 45. The other end of the drag link carries a collar 46 which rests against the back of a plate 47 fixed to the yoke arm 38. The collar 46 is secured in adjusted positions on the end of the drag link by means of a set screw 48.

There is also secured to the shaft 41 side arms or levers 49 on either side of the center arm 44. Said side arms are provided with apertures 50 for pivotal connection to the ends of piston rods 51 of hydraulic cylinders or jacks 52. Each side arm 49 carries a vertical row of apertures 50 to change the leverage between said piston rods and the jack shaft 41 as may be needed.

The hydraulic cylinders 52 are pin connected to lugs 53 on a transverse bar 54 across the top of the vertical supporting arms 55 of the plow bottom 56. Said plow bottoms may be of the type disclosed in co-pending application for patent, Serial No. 119,441, filed October 4, 1949, or of any other suitable type.

The vertical plow bottom arms are each swung between a pair of brackets 57 and 58 secured to and extending rearwardly from the frame members 11 and 12, the connection being effected by means of bolts or pins 60 passing through the walls of the brackets and the plow bottom arms.

Rearward extensions 61 at the top of the brackets act as lateral guides for the upper ends of arms 55. Bolts 62 across the back of the extensions 61 serve as abutments to limit the swing of the arms 55 so as to prevent the plow bottom when being lifted by the thrust of the cylinders 52 from being damaged by contact with the undercarriage.

Depending upon the operation to be performed by the implement, the plow bottom will be disposed in different angular positions relative to the ground. To provide for positive positioning of the plow bottom in different positions an eccentric abutment cam 63 is mounted forwardly of each arm 55 above the pins 60. The said cams are disposed between the brackets 57 and 58 so as to be in the line of travel of the arms 55 and are held in position by means of a bolt 64 passing through the sides of the brackets and the cam. Tightening these bolts frictionally secures the cam against the sides of the brackets. By loosening the bolts the position of the cam may be changed. Handles 65 are attached to the cams to facilitate manually moving them when the bolts are loosened.

From the above description it will be seen that the implement may be used by attaching the draw bar 16 to a tractor or other powered means.

The angle of incidence of the plow bottom with the soil can be adjusted by means of the hydraulic cylinders 52 and the adjusted positions maintained by the setting of the cams 63. The vertical position of the plow bottom 56 is adjusted by means of the hydraulic cylinder 18 acting through the link 39, arm 38, shaft 27, yokes 30, wedges 31 and arms 26 to which the ground wheels are attached, thereby raising or lowering the frame relative to the ground. When the hydraulic cylinder is actuated to lower the frame, motion is transmitted through the arm 38, drag link 45 and arm 44 to the jack shaft 41 and hence to the side arms 49 to modify the position of the plow bottom forwardly. When the hydraulic cylinder is actuated to raise the frame while the implement is in forward motion with the plow in the ground, the rearward pressure of the ground against the plow urges the drag link 45 forwardly and maintains the collar 46 against the arm 38. Adjustments of the position of the draw bar are made by means of buckle joint 40 and individual adjustments of the ground wheels are made by turning the cranks 37. The relation between the linkage system of the ground wheels and that of the plow bottoms is adjusted by means of the collar 46.

By these means, therefore, it is possible to adapt the implement to any desired conditions of operation and alter these conditions at will. Where appropriate adjustments may be made by actuation of either or all of the cylinders 18 and 52 they may be accomplished while the implement is in motion by use of suitable controls (not shown) on the tractor connected to said cylinders through hydraulic tubes 66 and 67 leading from said cylinders.

In actual practice, a restrictor may be disposed in the hydraulic line leading to cylinder 18 to retard the action of its piston rod 23 in relation to the travel of the piston rods 51 of cylinders 52. Different movements of the piston rods 23 and 51, relative to each other, may be effected by using restrictors of different sizes. For example, the full travel of the piston rods 51 may be approximately half completed before the piston rod 23 makes any appreciable travel. This is desirable in order to vary the suction of the plow without materially changing the depth of plowing. After the movement of the piston rods 51 is complete, the piston rod 23 continues to travel, thereby raising the frame.

During these movements of the piston rods 23 and 51, pressure on drag link 45 is relieved sufficiently to allow the plow bottom 56 to return to the original or plowing position. Any further or finer adjustments in the linkage systems to vary or modify the relative movements of the piston rods may be made by the means described above, including changing the connection between the piston rods 51 and arms 49 through holes 50 and relocation of the collar 46 on the drag link 45.

The modification illustrated in Figure 4 comprises mounting an eccentric cam 68 on the bolt 62 between the extensions 61 whereby the arms 55 may be locked in any desired position between the cams 63 and 68.

In the further modification shown in Figures 5 and 6, the locking of the arms 55 is accomplished by means of a set screw 69 passing through a web 70 across the back of the brackets 57 and 58 extending rearwardly beyond the arms 55, as shown. In this modification, the set screw arrangement substitutes for the cam 68 and it is apparent that a similar substitution of a set screw may be provided for the cam 63.

These modifications illustrate some of the many different ways in which an adjustable abutment and a locking means in conjunction therewith may be provided and it is to be understood that other adjustable abutments and locking means may be substituted therefor without departing from the spirit of this invention.

If the action of the arms 55 is completely restricted by these means, force exerted by the cylinders 52 will be transmitted entirely to yoke arms 38 through side arms 49, center arm 44, jack shaft 41 and drag link 45. In some instances, it may be desired to modify or restrict within limits, the full tilt or swing of the arms 55 to prevent clogging of the plow bottom 56. This effect may be provided by adjustment of the cam 68 or set screw 69, as the case may be.

I claim:

1. An agricultural implement comprising a frame supported on ground wheels, an eccentric axle shaft rotatably mounted on said frame, said wheels being mounted on said shaft, a radial arm secured to said shaft, a linkage system, including a hydraulic jack, connected to the arm and to the frame for changing the position of said wheels relative to said frame, a plow bottom swingably supported on the frame, a second shaft rotatably mounted on the frame parallel to the said axle shaft, a radial arm secured to the said second shaft, a hydraulic jack connected to the plow bottom and to said last mentioned arm, and one way interconnecting means whereby said shafts are simultaneously rotated in one direction by a force acting to rotate one of said shafts in that direction, and simultaneously in the opposite direction by a force acting to rotate the other shaft in said opposite direction.

2. An agricultural implement as defined by claim 1 in which the interconnecting means comprises an adjustable link connecting the two arms together.

3. An agricultural implement as defined by claim 1 in which the axle shaft has crank arms pivoted thereto, said crank arms carrying the ground wheels, and means for holding said crank arms in different pivoted positions on the axle shaft.

4. An agricultural implement as defined by claim 1 having abutments on the frame to limit the swinging movement of the plow bottom and means for adjusting the position of said abutments relative to the plow bottom.

5. An agricultural implement comprising a frame, an axle shaft rotatably mounted on said frame, arms pivoted to the outer ends of said axle, wheels carried by said arms eccentric to the axis of rotation of said shaft, a yoke secured to each end of said axle, said yoke straddling its corresponding arm, a wedge slidably carried by said arm, an abutment secured to said yoke adjacent said wedge on the side of said arm, means for adjusting the position of said wedge on said arm, a radial member connected to said shaft, a linkage system, including a hydraulic jack, connected to the member and frame for rotating said shaft, a plow bottom swingably supported on the frame, a second shaft rotatably mounted on the frame parallel to the first shaft, a radial lever secured to the said second shaft, a hydraulic jack connected to the plow bottom and to said lever, and one way interconnecting means whereby said shafts are simultaneously rotated in one direction by a force acting to rotate one of said shafts in that direction, and simultaneously in the opposite direction by a force acting to rotate the other shaft in said opposite direction.

6. An agricultural implement comprising a frame supported on ground wheels, an eccentric axle shaft rotatably mounted on said frame, said wheels being mounted on said axle shaft, a radial arm having one end secured to said shaft, a hydraulic jack having one end connected to the frame, a mechanical linkage between the other end of said jack and the other end of said arm, said linkage including a pivoted member having an extension thereof projecting forward of the vehicle, a hitching link connected to the forward end of said extension, a plow bottom swingably supported on the frame, a second shaft rotatably mounted on the frame parallel to the said axle shaft, a lever secured to the said second shaft, a hydraulic jack having one end pivoted to said lever and the other end pivoted to the plow bottom at a point offset from its swing axis, another lever secured to said second shaft, and a link connecting said second lever with said radial arm for simultaneous rotation of said shafts.

References Cited in the file of this patent

UNITED STATES PATENTS

| Number | Name | Date |
|---|---|---|
| 1,278,574 | Bennett | Sept. 10, 1918 |
| 1,312,281 | Springer | Aug. 5, 1919 |
| 1,931,815 | Conley | Oct. 24, 1933 |
| 1,969,684 | Bird | Aug. 7, 1934 |
| 2,091,427 | Brodersen | Aug. 31, 1937 |
| 2,309,203 | Morkoski | Jan. 26, 1943 |
| 2,424,459 | Hettelsater | July 22, 1947 |